May 9, 1950     J. B. WALKER     2,506,946
INDICATOR FOR THE BLIND
Filed Sept. 17, 1946     3 Sheets-Sheet 1
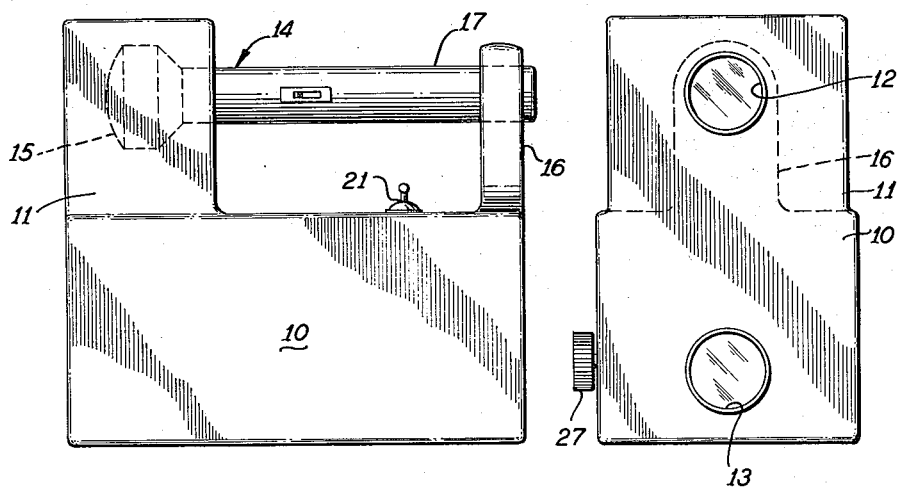
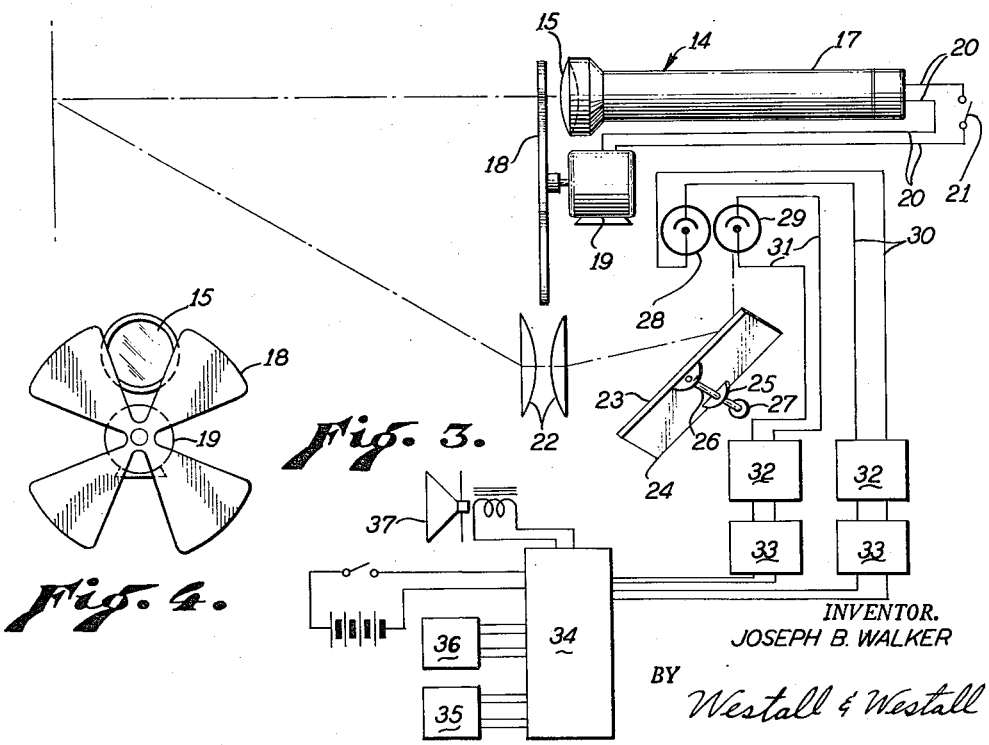
INVENTOR.
JOSEPH B. WALKER
BY Westall & Westall
ATTORNEYS May 9, 1950          J. B. WALKER          2,506,946
INDICATOR FOR THE BLIND Filed Sept. 17, 1946          3 Sheets-Sheet 2

INVENTOR.
JOSEPH B. WALKER
BY
Westall & Westall
ATTORNEYS

May 9, 1950   J. B. WALKER   2,506,946
INDICATOR FOR THE BLIND
Filed Sept. 17, 1946   3 Sheets-Sheet 3

INVENTOR.
JOSEPH B. WALKER
BY
Westall & Westall
ATTORNEYS

Patented May 9, 1950

2,506,946

UNITED STATES PATENT OFFICE 2,506,946

INDICATOR FOR THE BLIND

Joseph B. Walker, Hollywood, Calif.

Application September 17, 1946, Serial No. 697,568

9 Claims. (Cl. 177—352)

This invention relates to indicators for the blind, and contemplates more specifically portable transmitting and receiving equipment for radiant energy operable to detect and indicate the presence of an object by the utilization of reflected energy to activate audible signals variable in pitch with the distance or height of the object with respect to the disposition of the equipment.

The construction and utility of photo-electric cells by which an electrical current may be produced in response, and in proportion, to the intensity of light directed thereto is well known. Such devices have heretofore been employed to energize sound equipment for indicating audibly the intensity of light received by the photo-electric cell. In my co-pending application, Serial No. 566,521, filed December 4, 1944 for Photo-electric range finders, dual equipment of this type is embodied whereby the presence of an object may be ascertained and audibly indicated by electrical means energized through a current produced by, and variable in proportion to, the difference in light intensity reflected by the object to the respective photo cell units. Such equipment, however, requires constant readjustment and manipulation by the user in order to provide the requisite range of operation and the flexibility that is conducive to confidence in the use of the apparatus. In devices adapted for critical focusing upon objects located different distances therefrom, it is necessary for the user to effect the adjustment manually and determine any particular adjustment tactually.

It is a principal object of the present invention to obviate the aforementioned and other disadvantages in the prior art by the provision of mechanism for variably directing radiant energy adapted for reflection by objects to be detected located in a plane of variable depth, and for receiving and transforming energy so transmitted and reflected by such an object into electrical impulses for energizing an audible signal variable in pitch in response to a control synchronized with the operation of the transmitting and receiving mechanism.

Another object hereof is to provide a unit automatically activated by the presence of objects located at different distances from the unit to indicate audibly not only the presence of the object but the approximate position of or the distance between the unit and the object.

Another object hereof is to provide an indicator operable in response to intermittent light rays originating within the device and reflected by an object, the presence of which is to be detected, the intermittent light rays reflected being directed to energize one of a plurality of multiple signals differing in auditory characteristics with the distance of the object from the source of light.

Another object is to provide a unit of the character above alluded to embodying means for casting a movable beam of light forward of the unit, and means for continuously receiving the light rays reflected from objects, to which the beam is directed, lying in a common plane at a predetermined distance from the source of the light in combination with an audible signal variable in pitch with the angle assumed by the beam of light whereby the height or breadth, depending upon the direction of movement of the light beam, of any object may be audibly detected by a blind user.

Another object is the provision of a transmitter and receiver of ultra high frequency radio waves operable mechanically to continuously scan a predetermined area to which it is directed so as to receive reflected energy so transmitted and apply the same to energize audible signals variable in pitch with the distance, height, or breadth of an object within the area scanned by which the energy is reflected.

Numerous other objects, advantages, and features of my invention, such for example, as novel arrangement of the components in a case adapted for most convenient manipulation by a blind user, simplicity of construction, relative economy of manufacture, adaptability for use in daylight or darkness, and susceptibility to critical adjustment, will be apparent to those of skill in the art to which my invention appertains upon an examination of the following description read in the light of the accompanying drawings, in which:

Fig. 1 is a side elevation of a case in which the mechanism of my invention is housed;

Fig. 2 is an end elevation of the case, showing particularly the aperture through which energy is transmitted and received, respectively;

Fig. 3 is a diagrammatic view of one embodiment of apparatus comprising my invention;

Fig. 4 is a fragmentary elevation of the light source and showing particularly the light beam interrupter;

Figure 5:
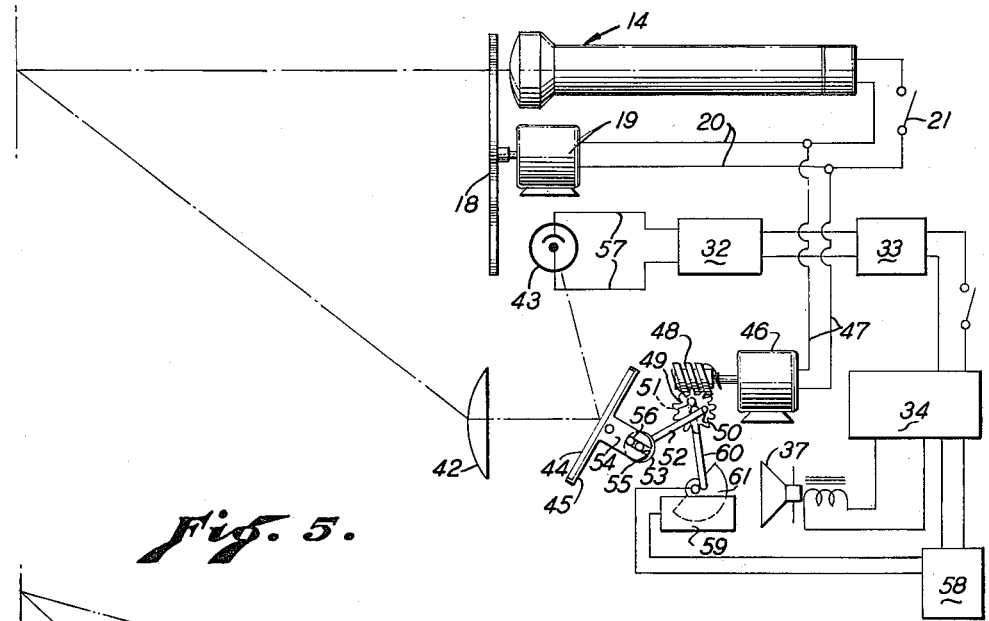
Fig. 5 is a diagrammatic view of a modified form of my invention.

Referring to the drawings in detail, the numerals of which indicate similar parts throughout the several views, it will be observed that the various embodiments of my invention each incorporate essentially a transmitting unit for directing a beam of light, high frequency radio waves or other radiant energy in any direction determinable by a blind user, in combination with a receiving unit operable to receive reflected energy and convert the same for use in energizing an audible signal by which the user can ascertain the size and distance of the object from which the energy was reflected.

The apparatus, regardless of the form in which it is embodied, is portable and is adaptable for assembly within a case 10 (Figs. 1 and 2) comprising a box structure for enclosing the receiving and signal equipment. One end of the box is extended upwardly to provide a compartment 11 for the light or wave beam transmitter, and is formed with vertically aligned apertures 12 and 13 for a purpose later referred to. In those embodiments incorporating a conventional flashlight as indicated at 14 as a transmitting unit, the head 15 of the flashlight is mounted in compartment 11 in optical alignment with the aperture 12 therein, and the butt of the light is supported above the box structure proper in a suitable mounting 16 whereby the handle or battery case 17 of the flashlight 14 furnishes a handle for case 10. This arrangement is particularly advantageous as it affords a direct means for controlling the transmission of the beam of light and thereby augmenting the feeling of security and confidence which the utility of the apparatus inspires in blind users. In those units operable to transmit radio waves, or which contemplate a different form of light source, a rod not shown may be substituted for the handle 17 of the flashlight to provide a means by which the unit may be carried and manipulated.

The embodiment of my invention illustrated in Figs. 3 and 4 comprises a conventional flashlight 14 mounted, as hereinabove described, within the case so as to direct a beam of light through the upper aperture 12 therein. A light beam interrupter comprising a four-bladed rotor 18 is journaled below the head 15 of the flashlight whereby the blades move accurately through the light beam. The interrupter 18 is actuated by means of a motor 19 suitably mounted in case 10 and connected in the same circuit 20 as the flashlight bulb not shown so as to be controlled by a single switch 21 conveniently located on the top of the case below the flashlight. It will thus be observed that an intermittent or pulsating light beam is produced and may be directed through aperture 12 and thrown in any direction by manipulation of the case by the user.

Mounted in case 10 in alignment with the lower aperture 13 and optically parallel with the light beam is a lens assembly generally indicated by the numeral 22 which is adapted to receive and transmit an image of the object or objects toward which the case is directed. Within the case 10 and rearwardly of the lens assembly 22 is a mirror 23 mounted on a backing 24 having laterally projecting lugs 25 integral therewith. Lugs 25 are rigidly mounted upon a rod 26 extending therethrough, which is journaled in opposite sides of the case in a suitable manner to permit pivotal adjustment of mirror 23. One end of rod 26 projects through one side of case 10 and is furnished with a knob 27 by which the pivotal adjustment of the mirror may be manually effected. Any suitable means may be employed such as the friction of the rod 26 in its bearings to normally maintain any desired adjustment of mirror 23 for a purpose about to be described. Located above mirror 23 and suitably mounted in the case are a pair of photo-electric cells 28 and 29, arranged in separate circuits 30 and 31 and adapted to produce a flow of electricity in their respective circuits in response to direction of light thereto.

The invention contemplates the amplification of the direct current produced in each of the cells 28 and 29 when activated by light reflected thereto by the mirror, and the utility of oscillators controlled by trigger tubes to transform the current of the circuits in which the respective cells are arranged into pulsating direct current of different frequencies for energization of a loud-speaker. It will be readily appreciated that the wiring of such equipment may take many forms and accordingly is only generally indicated herein. In accordance therewith, a pre-amplifier 32 and a trigger tube 33, the construction and operation of which is well known to those of skill in the art, are arranged in each circuit 30 and 31. Connected in both circuits 30 and 31 is the amplifier 34 by which the current produced in either circuit 30 and 31 by the respective photo-electric cells 28 and 29 is further amplified. A pair of conventional oscillators 35 and 36 are connected in the circuits 30 and 31, respectively, and are triggered by the tubes 33 to effect the oscillation or pulsation of the direct current produced in the respective photo-electric cells 28 or 29 when one or other of the latter is energized. It will be understood that the frequencies of the pulsating direct current produced by the oscillators is different in the respective circuits. Thus a loud speaker 37 connected to the amplifier 34 is effective to transmit sound of a frequency corresponding to the frequency of the pulsations of the circuit energized, whereby the sound produced by the loud-speaker 37 is easily recognizable by the user of the unit by its pitch as identified with one or the other of the photo-electric cells.

In the present embodiment the lens assembly 22 is adapted to encompass a wide field through the aperture 13 so as to transmit an image of any object to which the flashlight beam is directed throughout a pre-determined depth range of intended operation. For example, the device may be adjusted for the detection of an object located from two to ten feet from the unit and to indicate audibly by a sound at one pitch the presence of the object within the zone of from two to five feet, and by a sound of a different pitch the location of an object at from five to ten feet. Accordingly, the lens assembly 22 must be adapted to record an image of any object located from two to ten feet in direct alignment with the flashlight.

The amplifiers are responsive only to pulsating current and accordingly, the only light effective to energize photo-electric cells 28 and 29 will be that reflected from an object to be detected and originating in the interrupted flashlight beam. Mirror 23 is pivotally arranged to reflect the part of the image of an object within the range of the unit to which the flashlight is directed to one or the other of the photo-electric cells depending upon the proximity of the object to the unit and the adjustment of the mirror. Suitable stops (not shown) may be incorporated in case 10 to limit the pivotal movement of mirror 23 whereby the latter, when swung to the limit of its range of movement in one direction will reflect to one of the cells the intermittent light beam reflected from an object located from two to five feet from the unit, and when swung to the opposite end of its range of movement will reflect to the other cell the light beam reflected from an object located at from five to ten feet from the unit. Thus, it will be observed that the mirror may be initially positioned to reflect light rays to one of the photoelectric cells from a point on the center of the flashlight beam located two to five feet from the light source, and when mirror 23 is so adjusted, any object within that distance from the unit to which the light beam is directed will be detected. Correspondingly, the mirror may be fixed to reflect light rays to the other photoelectric cell and due to the arrangement of mirror 23, lens assembly 22, and photo-electric cells 28 and 29, such rays will necessarily be those reflected from an object at a greater predetermined distance from the unit.

When an object is detected in the manner just above described, the blind user may roughly determine its size by shifting case 10 upwardly and downwardly and laterally, for so long as the flashlight beam is played upon a surface capable of reflecting its light rays the energized photo-electric cell will continue to emit a current, pulsating synchronously with the light beam, effective to continuously activate the oscillator connected therewith and accordingly produce a sound in loud-speaker 37 of a pitch identified with the particular photo-electric cell energized.

The modified form of my invention illustrated in Fig. 5 embodies the same type of light transmitting apparatus as hereinabove explained, comprising a flashlight 14 and light beam interrupter 18 actuated by a motor 19 connected in the same circuit 20 with the flashlight 14 and controlled by a switch 21. The transmitter, and the reflected beam receiver about to be described, are mounted in case 10 with the flashlight aligned with the upper aperture 12 and a lens 42 of the receiver rigidly mounted in case 10 opposite aperture 13. A single photo-electric cell 43 is utilized which is adapted to receive a reflected light beam, transmitted by the lens 42, from a mirror 44 mounted upon a pivoted bracket 45 below the photo-electric cell 43 and rearwardly of lens 42. The lens 42 and mirror 44 are relatively positioned whereby the lens will transmit to the mirror an image of any object within a pre-determined distance range to which the flashlight beam may be directed, and mirror 44 is arranged to assure the reflection of the light beam to the cell 43 incident to proper pivotal adjustment thereof. For example, the mirror 44 may be disposed to transmit to the photo-electric cell a light beam reflected from an object located within a few feet of the unit, i. e., when assuming a position at one end of its range of pivotal movement. It will thus be seen, that in order to continually encompass the indicated range of operation mirror 4 must be reciprocated back and forth on its pivot. To this end I provide a motor 46 connected to flashlight circuit 20 by wires 47 and controlled by switch 21 so as to operate synchronously with the flashlight and motor 19. A worm gear 48 mounted upon the shaft of motor 46 is operatively engaged with a pinion 49 so as to drive the same continuously in one direction. A pair of eccentric crank pins 50 and 51 are integral with opposite sides of pinion 49, on one of which a crank arm 52 is pivoted. The opposite end of arm 52 is eccentrically pivoted to a disk 53 so as to transmit rotary motion from pin 50 to the disk. Across the face of the opposite side of disk 53 a lever 54, comprising an extension of the bracket 45 on which mirror 44 is mounted, extends and is bifurcated at 55 to receive between the bifurcations an eccentric pin 56 projecting laterally from the side of disk 53. Rotation of disk 53, imparted to the eccentric pin 56 with which bracket 45 is engaged reciprocates mirror 44 through an arc having a center on the fulcrum of the bracket.

The closing of switch 21 is thus operable to coincidentally energize both motors 19 and 46 with the transmission of an interrupted beam of light through the aperture 12. The continuous rotation of worm 48 and pinion 49 in response to the activation of motor 46 slowly oscillates mirror 44 on its pivot. During one-half of each revolution of disk 53, mirror 44 is moved from one extreme position, effective to transmit to the cell 43 a reflection of an illuminated object located at, for example, ten feet from the unit, representing the outer end of the range of operation of the device, to an opposite extreme position whereby the mirror reflects an image of an object located at, for example, two feet from the unit and illuminated by the intermittent light beam, to the cell. Continued rotary movement of disk 53 through the opposite half of its revolution in response to the uninterrupted drive of motor 46 functions to return the mirror to its original position. Thus an image of any object located within the ten foot range of the receiving apparatus to which the light beam is directed will be reflected by the mirror to the photo-electric cell 43 and activate the latter. As in the embodiment hereinabove described, the current produced by the photo-electric cell is amplified in a pre-amplifier 32 with which it is connected through the wires of circuit 57. The amplified impulses pass through a trigger tube 33 to the amplifier 34 with which an oscillator 58 is connected, operable to generate impulses of a predetermined frequency variable synchronously with the operation of mirror 44. To this end, a variable condenser 59, located adjacent motor 46, is connected in the oscillator circuit to control the operation of the oscillator 58. Condenser 59 in turn, is actuated by a crank arm 60 having one end pivoted to the movable plate 61 of condenser 59 and its opposite end pivoted on the eccentric crank pin 51 on the side of pinion 49 opposite to that to which the crank arm 52 is pivoted. A loud-speaker 37 connected with the oscillator 58 through the amplifier 34 is operable to produce a sound of a pitch variable with the frequency of the oscillations generated by the oscillator 58 in response to the control of the variable condenser 59.

When an object comes into the optical range of the flashlight 14 whereby light rays reflected by the object will be transmitted by the lens 42 to the mirror 44 and reflected by the latter to the photo-electric cell 43, the loud-speaker 37 will emit a sound of a pitch determined by the corresponding adjustment of the variable condenser 59. With the distance between the unit and the object detected remaining constant the photoelectric cell 43 will be activated intermittently, i. e., whenever the constantly reciprocating mirror 44 reaches a position where it will reflect to the cell light rays emanating from the object as a result of the direction of the interrupted beam of light from flashlight 14 thereto. The distance of the object thus detected by the apparatus will be indicated to the blind user by the pitch of the sound produced by the loud-speaker.

Figure 6:
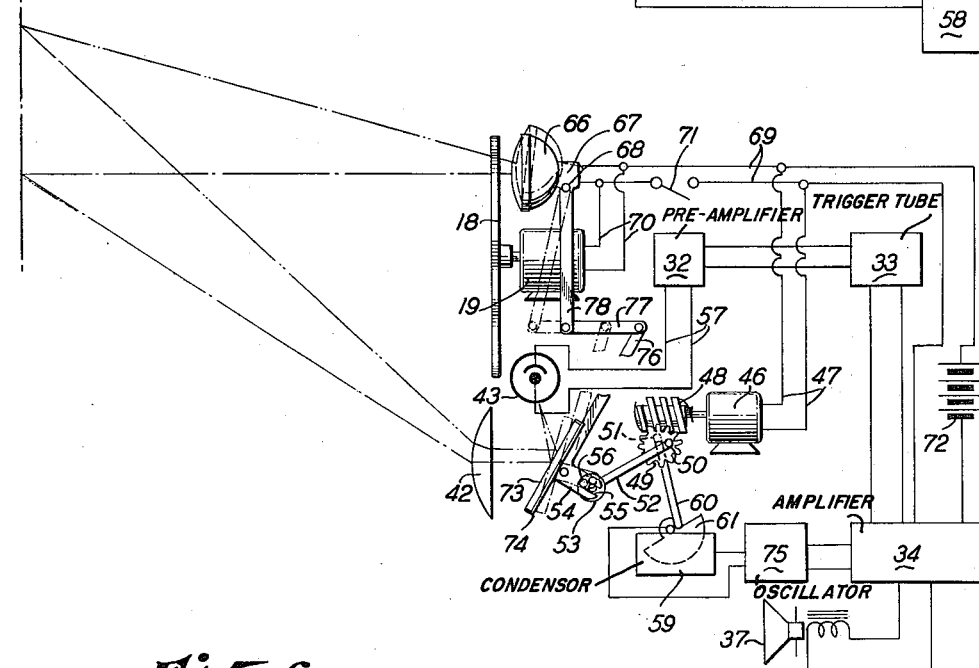
Fig. 6 is a diagrammatic view of a third embodiment hereof.

In Fig. 6, another modification of my invention is depicted which is primarily distinguished from each of the others hereinabove described in being capable of detecting and indicating audibly the vertical dimension of an object in a plane located at a predetermined fixed distance from the unit. The apparatus about to be described is mounted in case 10 with a lamp assembly 66 of conventional construction mounted upon a bracket 67 pivoted directly in back of the upper aperture 12. A handle for case 10 is provided by a rod (not shown) substituted for the flashlight battery case heretofore specifically alluded to. Bracket 67 supporting lamp 66 is pivoted at 68 for movement through a vertical arc so as to correspondingly direct a movable beam of light from the case through aperture 12. The light beam interrupter 18 and motor 19 therefor, are positioned to assure the interception of the beam intermittently regardless of the pivotal adjustment of lamp 66. Motor 19 and the lamp bulb (not shown) are energized through the circuits 69 and 70, respectively, controlled by a single switch 71 from a battery 72.

A single photo-electric cell 43 is employed, being activated by light rays reflected by a pivoted mirror 73 as in the embodiment of Fig. 5. The mirror is reciprocated on its pivot by a motor 46 through a worm 48, pinion 49, crank arm 52 and bracket 74 on which mirror 73 is mounted, in the same manner as is hereinabove described with reference to Fig. 5, the motor 46 being connected by wires 47 in the flashlight circuit 69.

The pulsating current produced by the photo-electric cell 43 in response to the light rays directed thereto by mirror 73 is amplified by a pre-amplifier 32, controlled by a trigger tube 33 and again amplified by amplifier 34 to energize an oscillator 75 which in turn is controlled by a variable condenser 59 to produce a sound of variable pitch in the loud-speaker 37 in accordance with the operation of the embodiment hereinabove referred to. The movable plate 61 of condenser 59 is actuated by motor 46 through a crank arm 60 and pinion 49, also as described above with reference to Fig. 5.

The lamp is reciprocably swung on its pivot synchronously with the operation of mirror 73 through a lever assembly comprising an upwardly projecting lever 76, integral with the mirror bracket 74. The upper end of lever 76 is pivoted to one end of a link 77, the opposite end of the latter being pivoted to a lever 78 depending from the lamp bracket 67. As the mirror 73 is tilted rearwardly in response to the operation of motor 46, the lever 76 correspondingly draws the link 77 and lower end of lever 78 rearwardly, tilting the lamp beam downwardly. As the image of the object to be detected will be inverted by the lens 42, the proper proportionment of the levers 76 and 78 and link 77 and the lamp and mirror brackets 67 and 74 results in the convergence of the primary light beam and the light rays which the mirror 73 is adapted to reflect to the photo-electric cell 43 in the same plane regardless of the adjustment of the mirror and lens 42. Any object lying or coming into such plane to which the light beam from the lamp 66 is directed, will reflect the light through lens 42 and such light rays will be re-directed by mirror 73 to the photo-electric cell. Thus while the light beam from the lamp continuously scans, vertically, the area forward of the case the mirror is coincidently and synchronously adjusted to reflect to cell 43 light rays reflected by an object, lying in a predetermined plane, to which the primary beam is directed. It will be appreciated that by varying the arrangement of the lens 42, mirror 73 and photo-electric cell 43 with respect to one another, the depth of the area in which objects can be detected may be correspondingly increased or decreased. As the beam of light and the mirror will continuously and synchronously reciprocate in vertical arcs a sound will be produced by loud-speaker 37 in response to the reflection of light from any vertical point in the plane at which the primary light beam and the light rays adapted for reflection by the mirror to the photo-electric cell, converge, within the range of operation of the unit regardless of the vertical disposition of the object. However, the user is further enabled to determine the approximate height of the object detected incident to the synchronous operation of the variable condenser 59 by which the oscillator frequency and pitch of the sound emitted by the speaker is increased or decreased with each change in the direction of the light beam and angle of the mirror 73. An object near the ground or located at any particular level within the range of operation of the unit as above described, will be audibly detected by the user by an intermittent sound emitted by the loud-speaker 37, of a pitch peculiar to the height of the object. The length of the individual intermittent sounds further indicates the vertical dimension of the object, while the emission of an unbroken sound from the loud-speaker indicates to the user that an object at least as tall as the range of the light beam is detected.

Figure 7:
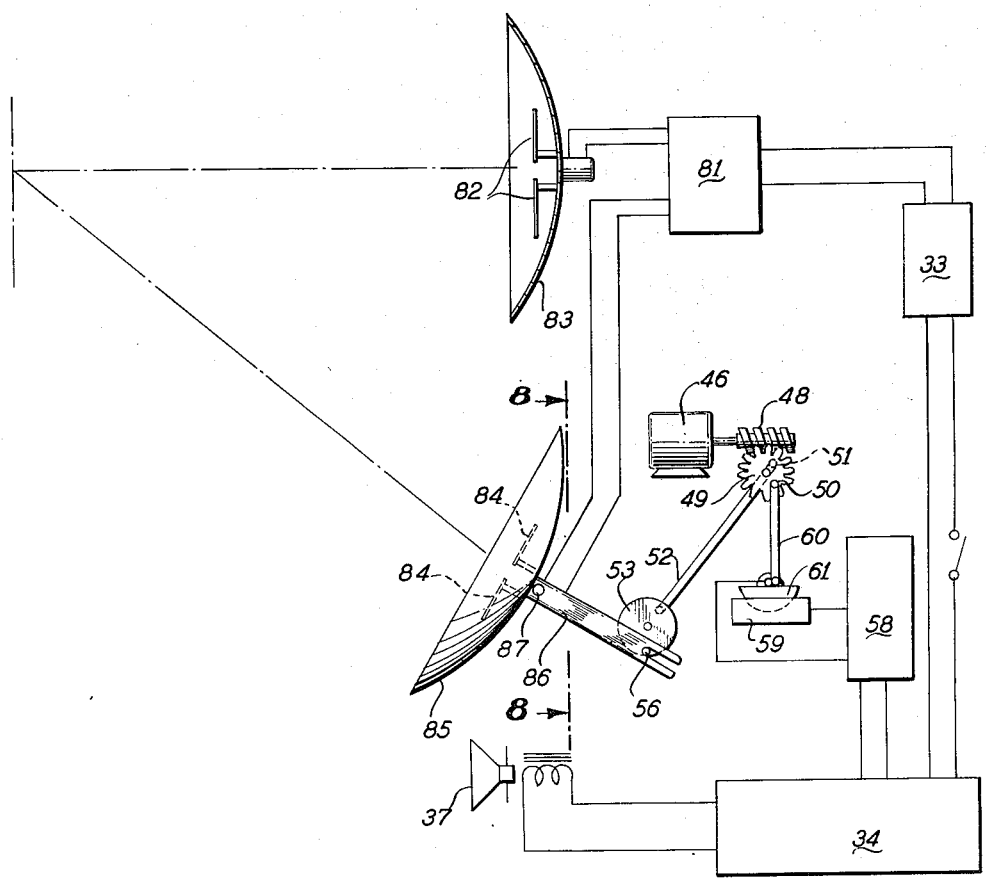
Fig. 7 is a diagrammatic view of still another modified form of my invention.
Figure 8:
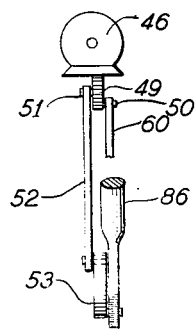
Fig. 8 is a sectional view taken on line 8—8 of Fig. 7, depicting the arrangement of the linkage through which the transmitter and receiver equipment are adjusted.

In Fig. 7 another embodiment, calling for the transmission and reception of a different form of radiant energy, namely ultra high frequency radio waves, is disclosed. For this purpose I utilize a conventional ultra high frequency transmission and receiving unit 81 suitably mounted in case 10. The transmitter assembly includes a dual antenna 82 mounted within a stationary wave guide 83 by which a radio wave beam may be directed forwardly of the unit through aperture 12 in the case. The receiver includes a receiving antenna 84 carried within an adjustable wave guide 85 which is mounted upon a lever 86 pivoted at 87 in case 10. Due to the presence of the wave guide 85 the receiving antenna 84 is adapted to receive ultra high frequency radio waves directed to and reflected from an object located on the axis of the guide 85. Thus, it will be appreciated that unless the axes of the respective transmitting and receiving wave guides 83 and 85 converge upon an object no reception of reflected energy is possible. However, in order to render the unit operable to detect the presence of objects located at various distances from the unit the receiving wave guide 85 and the antenna assembly 84 is continuously reciprocated through a vertical arc. To this end a motor 46 is provided for rotating a pinion 49 through a worm 48X. The rotation of pinion 49 is transmitted to a disk 53, journalled in case 10, by means of a crank arm 52, the ends of which are pivoted on eccentric pins projecting from the sides of pinion 49 and disk 53, respectively. The end of lever 86 opposite to that at which the receiving antenna 84 is mounted, is slotted to receive an eccentric pin 56 extending laterally from the disk 53 whereby the rotation of the latter is operable to reciprocate the wave guide 85 and antenna 84 arcuately as hereinabove indicated.

Ultra high frequency impulses reflected by an object to be detected and received by the receiving antenna 84 are transmitted to the receiving unit 81 where they are amplified and carried through the trigger tube 33 to the amplifier 34 with which an oscillator 58 is connected. 59 indicates generally a variable condenser actuated from the pinion 49 as in the embodiments of Figs. 5 and 6.

It will thus be seen that through the directional control assured by the stationary wave guide 83, the high frequency radio waves are always transmitted in the same direction with respect to the axis of case 10. Objects to be detected to which the beam is directed will reflect the waves to, and the latter will be picked up by, the antenna 84 of the receiver whenever the wave guide 85 of the latter is arranged in substantial axial alignment with the point of reflection upon the object. As the object may enter the transmitted beam from the side and thus be located at any distance from the unit within its range of operation when initial detection is required, adjustment of receiving antenna 84 is required to assure detection. In order to permit detection throughout a predetermined distance range, the receiving wave guide 85 and antenna 84 is reciprocated arcuately by motor 46 in the manner of the embodiments of Figs. 5 and 6 and, being vertically aligned with the transmitting antenna 82 will receive reflected high frequency impulses from any point on the axis of the transmitter wave guide 83 at which reflection of the radio waves occurs, due to the convergence of the axes of the respective wave guides 83 and 85 at a continuously moving point along the axis of the stationary guide 83. Thus the receiving antenna 84 is in a position at some time during each cycle of operation to receive reflected energy from an object within the range of operation of the unit to which the beam is transmitted regardless of the distance between the object and the case. At the moment at which the axes of the transmitting and receiving wave guides 83 and 85 converge upon an object, energy amplified by the receiving unit 81 and the amplifier 34 will activate oscillator 58 and through it the loud-speaker 37 to indicate audibly the detection of the object. The distance of the object from the case will be indicated by the pitch of the sound produced, due to the control of the oscillator 58 by the variable condenser 59 which is synchronized with the operation of the receiving wave guide 85 as in the embodiments of Figs. 5 and 6.

The revolving condenser is used only as an illustration of a means of changing the oscillator pitch synchronously with variations in the angle of reflection, there being other ways well known in the art for accomplishing the same result, as, for example, in a unit embodying one or more photo-electric tubes by biasing the voltage through conventional means. In double photo-electric tube models the oscillator circuit or circuits may be biased differently for each photo-electric tube having a different oscillator pitch, depending upon which photo-electric tube is energized.

The several embodiments shown and above described are merely illustrative and are preferred according to the particular utility intended. Numerous changes may be made in size, design, proportion, shape and number of the various parts, and more specifically the mirror may be pivoted through a horizontal arc if desired in response to manual or mechanical impetus, or any conventional mechanism may be substituted for the motor-driven lever apparatus to cause the mirror and/or primary light beam to scan a predetermined area horizontally and vertically, and a mirror stationary with respect to the photo-electric cell may be utilized in any of the embodiments by incorporating a moveable lens operable to appropriately vary the angle of deflected light beam, all without departing from the spirit of my invention as defined in the appended claims. In the claims and in the above description, the term "photo-electric cell" also includes "photo-electric tube," which device is in many embodiments preferred.

What I claim and desire to secure by Letters Patent is:

1. In a device of the character described, means to transmit a light beam, a signal, means including a photo-electric cell energized in response to light rays to activate said signal, a mirror, and means to shift said mirror relative to said cell to direct light reflected from different points, selectively, within said light beam to said cell, and means synchronized with the shifting of the mirror to vary said signal.

2. In a device of the character described, means to transmit a light beam, a signal, means including a photo-electric cell energized in response to light rays to activate said signal, a mirror, means to shift said mirror relative to said cell to direct light reflected from different points, selectively, within said light beam to said cell, and means synchronized with the movement of said mirror to vary said signal.

3. In a device of the character described, means to transmit a light beam, an audible signal, means including a photo-electric cell energized in response to light rays directed thereto, to energize said signal, a mirror moveable relative to said cell to either of two positions to direct light rays reflected from different points, respectively, in said light beam to said photo-electric cell to energize said signal, and means to vary the pitch of said signal synchronously with the movement of said mirror.

4. In a device of the character described, a cabinet, means in said cabinet to transmit a beam of radiant energy, a signal, signal-energizing means in said cabinet activated by a beam of radiant energy transmitted by said first-named means and reflected from an object to be detected to energize said signal, control means movable relative to said cabinet and to said signal-energizing means to receive energy reflected from, selectively, either of two points, in the beam of transmitted energy and to direct said energy to said signal-energizing means, and means to vary the signal synchronously with the operation of said control.

5. In a device of the character described, a cabinet, means in said cabinet to transmit a beam of radiant energy, a signal, signal-energizing means in said cabinet activated by a beam of radiant energy transmitted by said first-named means and reflected from an object to be detected to energize said signal, control means movable relative to said cabinet and to said signal-energizing means to alternately receive energy reflected from two separate points in the beam of transmitted energy and to direct said energy to said signal-energizing means, means to continuously and uniformly actuate said control means, and means to vary said signal synchronously with the movement of said control means.

6. In a device of the character described, means to transmit a beam of radiant energy variously through a predetermined area, a signal, signal-energizing means activated by a beam of radiant energy transmitted by said first-named means and reflected from an object to be detected to energize said signal, means to shift said first-named means to vary the angle of the transmitted beam, control means to direct energy reflected from an object to be detected and transmitted by said first-named means to said signal-energizing means, and means to shift said control means synchronously with the operation of said first-named means whereby energy reflected successively from different points in a single plane is directed by said control means to said signal-energizing means.

7. In a device of the character described, means to transmit a beam of radiant energy variously through a predetermined area, a signal, signal-energizing means activated by a beam of radiant energy transmitted by said first-named means and reflected from an object to be detected to energize said signal, means to shift said first-named means to vary the angle of the transmitted beam, control means to direct energy reflected from an object to be detected and transmitted by said first-named means to said signal-energizing means, means to shift said control means synchronously with the operation of said first-named means whereby energy reflected successively from different points in a single plane is directed by said control means to said signal-energizing means, and means to vary the signal operable synchronously with the operation of said last-named means.

8. In a device of the character described, a cabinet equipped with a handle to facilitate manual transportion of the cabinet, means within said cabinet to transmit a beam of radiant energy, means to shift said first named means to scan a predetermined plane with the beam of energy, a signal within said cabinet, signal-energizing means activated in response to energy reflected from said plane to energize said signal, a member sensitive to the energy transmitted by said first named means to transmit to said signal energizing means energy transmitted by said first named means and reflected from said plane, and means to shift said member relative to said cabinet and signal-energizing means to continuously receive reflected energy from different points in said plane to which it is directed by said first named means, and means to vary said signal synchronously with the shifting of said member.

9. In a device of the character described, a cabinet equipped with a handle to facilitate manual transportation of the cabinet, means within said cabinet to transmit a beam of radiant energy, a signal within said cabinet, signal-energizing means activated in response to energy reflected from objects within said beam to energize said signal, a member sensitive to the energy transmitted by said first named means to transmit to said signal-energizing means energy transmitted by said first named means and reflected from said objects, and means to shift said member relative to said cabinet and signal-energizing means to continuously receive reflected energy from spaced objects to which it is directed by said first named means, and means to vary said signal synchronously with the shifting of said member.

JOSEPH B. WALKER.

REFERENCES CITED

The following references are of record in the file of this patent:

UNITED STATES PATENTS

| Number | Name | Date |
| --- | --- | --- |
| 1,820,357 | Lindstrom et al. | Aug. 25, 1931 |
| 1,954,204 | Hayes | Apr. 10, 1934 |
| 2,081,134 | Buckley | May 25, 1937 |
| 2,216,716 | Withem | Oct. 1, 1940 |
| 2,237,193 | Mobsby | Apr. 1, 1941 |
| 2,297,534 | Brulin | Sept. 29, 1942 |
| 2,350,820 | Rettinger | June 6, 1944 |
| 2,365,580 | Murcek | Dec. 19, 1944 |
| 2,379,496 | Saunier | July 3, 1945 |

OTHER REFERENCES

Electronics, publication, pages 116–119, March 1946.